United States Patent
Süling et al.

(10) Patent No.: US 6,864,208 B2
(45) Date of Patent: Mar. 8, 2005

(54) METHOD FOR PRODUCTION OF A SOLID CATALYST FOR OLEFIN POLYMERIZATION

(75) Inventors: Carsten Süling, Frankenthal (DE); Wolf Spaether, Cincinnati, OH (US); Nicola Paczkowski, Loveland, OH (US); Joachim Rösch, Ludwigshafen (DE); Joachim Wulff-Döring, Frankenthal (DE); Wolfgang Bidell, Mannheim (DE)

(73) Assignee: Basell Polyolefine GmbH (DE)

( * ) Notice: Subject to any disclaimer, the term of this patent is extended or adjusted under 35 U.S.C. 154(b) by 112 days.

(21) Appl. No.: 10/168,268

(22) PCT Filed: Dec. 11, 2000

(86) PCT No.: PCT/EP00/12510

§ 371 (c)(1),
(2), (4) Date: Oct. 22, 2002

(87) PCT Pub. No.: WO01/46271

PCT Pub. Date: Jun. 28, 2001

(65) Prior Publication Data

US 2004/0063570 A1 Apr. 1, 2004

(30) Foreign Application Priority Data

Dec. 21, 1999 (DE) .......................................... 199 62 129

(51) Int. Cl.[7] .......................... B01J 31/00; B01J 37/00; C08F 4/02; C08F 4/60
(52) U.S. Cl. ...................... 502/111; 502/125; 502/134; 502/154; 502/156; 526/124.9
(58) Field of Search ................................. 502/125, 134, 502/154, 156; 528/124.9

(56) References Cited

U.S. PATENT DOCUMENTS

| | | | |
|---|---|---|---|
| 4,469,648 A | 9/1984 | Ferraris et al. | 264/9 |
| 4,794,096 A | 12/1988 | Ewen | 502/117 |
| 5,371,260 A | 12/1994 | Sangokoya | 556/171 |
| 5,391,793 A | 2/1995 | Marks et al. | 556/179 |

FOREIGN PATENT DOCUMENTS

| | | |
|---|---|---|
| DE | 19833170 | 1/2000 |
| EP | 0284708 | 10/1988 |
| EP | 0435514 | 7/1991 |
| EP | 0436326 | 7/1991 |
| EP | 0447070 | 9/1991 |
| EP | 0500944 | 9/1992 |
| EP | 0621279 | 10/1994 |
| EP | 0633264 | 1/1995 |
| WO | 91/09882 | 7/1991 |
| WO | 99/06414 | 2/1999 |

OTHER PUBLICATIONS

Wisenfeldt et al., "WVII. Racemic and meso diastereomers of group IV metallocene derivatives with symmetrically substituted, dimethylsilanediyl–bridged ligand frameworks. Crystal structure of R,S– $Me_2Si(3-t-Bu-5-MeC_5H_2)_2-ZrCl_2$" *J. of Organometallic Chemistry* 369:359–370 (1989).

Primary Examiner—Mark L. Bell
Assistant Examiner—J. Pasterczyk
(74) Attorney, Agent, or Firm—Connolly Bove Lodge & Hutz LLP

(57) ABSTRACT

A catalyst solid for olefin polymerization comprising
  A) at least one magnesium halide,
  B) at least one metallocene complex and
  C) at least one compound capable of forming metallocenium ions,
is prepared by
  i) firstly preparing finely divided support particles consisting of the magnesium halide A) and an $C_1$–$C_8$-alcohol having a mean particle diameter of from 1 to 200 μm from an adduct of the magnesium halide A) and a $C_1$–$C_8$-alcohol, where the adduct contains from 1.5 to 5 mol of the $C_1$–$C_8$-alcohol per mole of magnesium halide,
  ii) then depositing the compound C) capable of forming metallocenium ions on the finely divided support particles and
  iii) subsequently bringing the reaction product hereby obtained into contact with the metallocene complex B). This catalyst solid can be used for the polymerization or copolymerization of olefins.

8 Claims, No Drawings

METHOD FOR PRODUCTION OF A SOLID CATALYST FOR OLEFIN POLYMERIZATION

The present invention relates to a process for preparing a catalyst solid for olefin polymerization comprising
A) at least one magnesium halide,
B) at least one metallocene complex and
C) at least one compound capable of forming metallocenium ions.

The invention further relates to a catalyst solid for olefin polymerization, the use of the catalyst solid for the polymerization or copolymerization of olefins and a process for preparing polyolefins by polymerization or copolymerization of olefins in the presence of the catalyst solid.

Metallocenes are of great interest as catalysts for the polymerization of olefins, because they allow the synthesis of polyolefins which are not obtainable by means of conventional Ziegler-Natta catalysts. For example, metallocene catalysts lead to polymers having a narrow molar mass distribution and uniform incorporation of comonomers. However, for the metallocenes to be able to be used successfully in polymerization processes in the gas phase or in suspension, it is necessary for them to be used in the form of a solid, i.e. for them to be applied to a solid support.

As solid support materials, use is frequently made of silica gels, since this material allows the production of porous particles whose size is suitable for use as supports in olefin polymerization. Spray-dried silica gels made up of spherical agglomerates of smaller granular particles, namely the primary particles, have been found to be particularly useful.

However, the use of silica gels as support material has been found to be a drawback in some applications. In the production of film products, specks caused by silica gel particles remaining in the polymer can be formed. The production of fiber products is also problematical. Here, filtration of the melt is usually carried out prior to spinning. If the polymers contain too large an amount of particulate catalyst residues, an overpressure can be built up at the screen plate. This leads to considerable process engineering difficulties such as shortened operating times for the filters.

A support material frequently used in Ziegler-Natta catalysts is magnesium chloride. It is known that supports produced from this material fragment easily and leave hardly any residues in the product.

For this reason, attempts have already been made to support metallocene complexes on magnesium chloride. EP-A 500 944, for example, describes metallocene catalysts comprising milled anhydrous magnesium chloride.

EP-A 436 326 discloses a catalyst solid which consists of spherical particles and is suitable for the heterogeneous polymerization of olefins. This catalyst solid comprises a support containing from 80 to 99.9 mol % of magnesium chloride and from 0.1 to 20 mol % of at least one electron donor compound which contains no acidic hydrogen atom, a zirconium-containing metallocene complex and, if desired, an organoaluminum compound. As suitable electron donors, mention is made of ethers, thioethers, esters, sulfones, sulfoxides, secondary and tertiary amines, tertiary phosphines and phosphoramides. Water, alcohols or phenol are explicitly ruled out as electron donors.

EP-A 435 514 describes a catalyst solid in whose preparation spherical particles containing from 80 to 99.9 mol % of magnesium chloride and from 0.1 to 20 mol % of at least one electron donor compound which contains no acidic hydrogen atom are prepared first. The solid particles are then brought into contact firstly with an electron donor compound containing acidic hydrogen atoms and subsequently with a zirconium-containing metallocene complex and, if desired, an organoaluminum compound. Examples of electron donors having acidic hydrogen atoms mentioned are alcohol, phenol, primary amide, primary or secondary amine or primary or secondary phosphine.

However, these metallocene catalysts comprising magnesium chloride known from the prior art have the disadvantage that the morphology of the polymer particles obtained in the polymerization is still capable of improvement. In addition, the use of, in particular, various electron donors in the preparation of the catalyst solids complicates the preparation process.

It is an object of the present invention to remedy the abovementioned disadvantages and, in particular, to provide a catalyst solid which leaves no troublesome particulate catalyst residues in the polymer, which can be prepared by an uncomplicated, economical process and which makes it possible to prepare polyolefins having a good polymer morphology, i.e. virtually no formation of lumps or fine dust.

We have found that this object is achieved by a process for preparing a catalyst solid for olefin polymerization comprising A) at least one magnesium halide,
B) at least one metallocene complex and
C) at least one compound capable of forming metallocenium ions, which comprises i) firstly preparing finely divided support particles having a mean particle diameter of from 1 to 200 $\mu$m from an adduct of the magnesium halide A) and a $C_1$–$C_8$-alkanol, where the adduct contains from 1.5 to 5 mol of the $C_1$–$C_8$-alkanol per mole of magnesium halide,
ii) then depositing the compound C) capable of forming metallocenium ions on the finely divided support particles and
iii) subsequently bringing the reaction product obtained in this way into contact with the metallocene complex B).

Furthermore, we have found a catalyst solid for olefin polymerization, the use of the catalyst solid for the polymerization or copolymerization of olefins and a process for preparing polyolefins by polymerization or copolymerization of olefins in the presence of the catalyst solid.

The catalyst solids prepared by the process of the present invention are particularly suitable for the polymerization of olefins and especially the polymerization of $\alpha$-olefins, i.e. hydrocarbons having terminal double bonds. Suitable monomers include functionalized olefinically unsaturated compounds such as ester or amide derivatives of acrylic and methacrylic acids, for example acrylates, methacrylates or acrylonitrile. Preference is given to nonpolar olefinic compounds, including aryl-substituted $\alpha$-olefins. Particularly preferred $\alpha$-olefins are linear or branched $C_2$–$C_{12}$-alk-1-enes, in particular linear $C_2$–$C_{10}$-alk-1-enes such as ethylene, propylene, 1-butene, 1-pentene, 1-hexene, 1-heptene, 1-octene, 1-nonene, 1-decene or 4-methyl-1-pentene or unsubstituted or substituted vinylaromatic compounds such as styrene, p-methylstyrene, p-chlorostyrene, 2,4-dimethylstyrene, 4-vinylbiphenyl, vinylnaphthalene or vinylanthracene. It is also possible to polymerize mixtures of various $\alpha$-olefins.

In particular, the catalyst solids of the present invention can be used for the polymerization or copolymerization of ethylene or propylene. As comonomers in ethylene polymerization, preference is given to using $C_3$–$C_8$-$\alpha$-olefins, in particular butene, pentene, hexene and/or octene.

Preferred comonomers in propylene polymerization are ethylene and/or butene.

In the preparation of the catalyst solid, various magnesium halides A) such as magnesium chloride, magnesium bromide or magnesium iodide can be used as support materials. Particular preference is given to using magnesium chloride.

Metallocene complexes suitable as component B) are those of the formula (I)

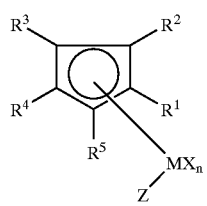

(I)

where the substituents and indices have the following meanings:

M is titanium, zirconium, hafnium, vanadium, niobium or tantalum, or an element of transition group III of the Periodic Table or the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, n is 1, 2 or 3 and corresponds to the valence of M minus 2, where $R^6$ and $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different, $R^1$ to $R^5$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, where two adjacent radicals may also together form a saturated or unsaturated cyclic group having from 4 to 15 carbon atoms, or $Si(R^8)_3$ where $R^8$ can be $C_1$–$C_{10}$-alkyl, $C_3$–$C_{10}$-cycloalkyl or $C_6$–$C_{15}$-aryl, and Z is as defined for X or

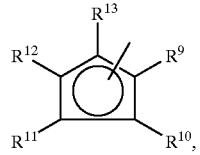

where the radicals $R^9$ to $R^{13}$ are hydrogen, $C_1$–$C_{10}$-alkyl, 5- to 7-membered cycloalkyl which may in turn bear $C_1$–$C_{10}$-alkyl groups as substituents, $C_6$–$C_{15}$-aryl or arylalkyl, where two adjacent radicals may also together form a saturated or unsaturated cyclic group having from 4 to 15 carbon atoms, or $Si(R^{14})_3$ where $R^{14}$ is $C_1$–$C_{10}$-alkyl, $C_3$–$C_{10}$-cycloalkyl or $C_6$–$C_{15}$-aryl, or the radicals $R^4$ and Z together form a —$R^{15}$—A— group, where

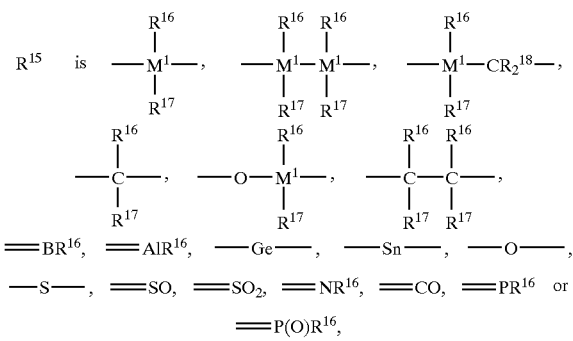

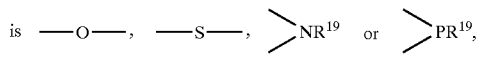

where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is —O—, —S—, $>NR^{19}$ or $>PR^{19}$, where $R^{19}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^4$ and $R^{12}$ together form a —$R^{15}$— group.

The radicals X in the formula (I) are preferably identical.

Among the metallocene complexes of the formula (I), preference is given to

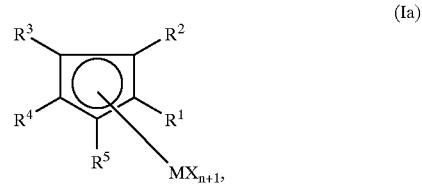

(Ia)

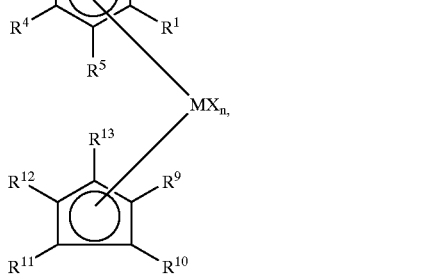

(Ib)

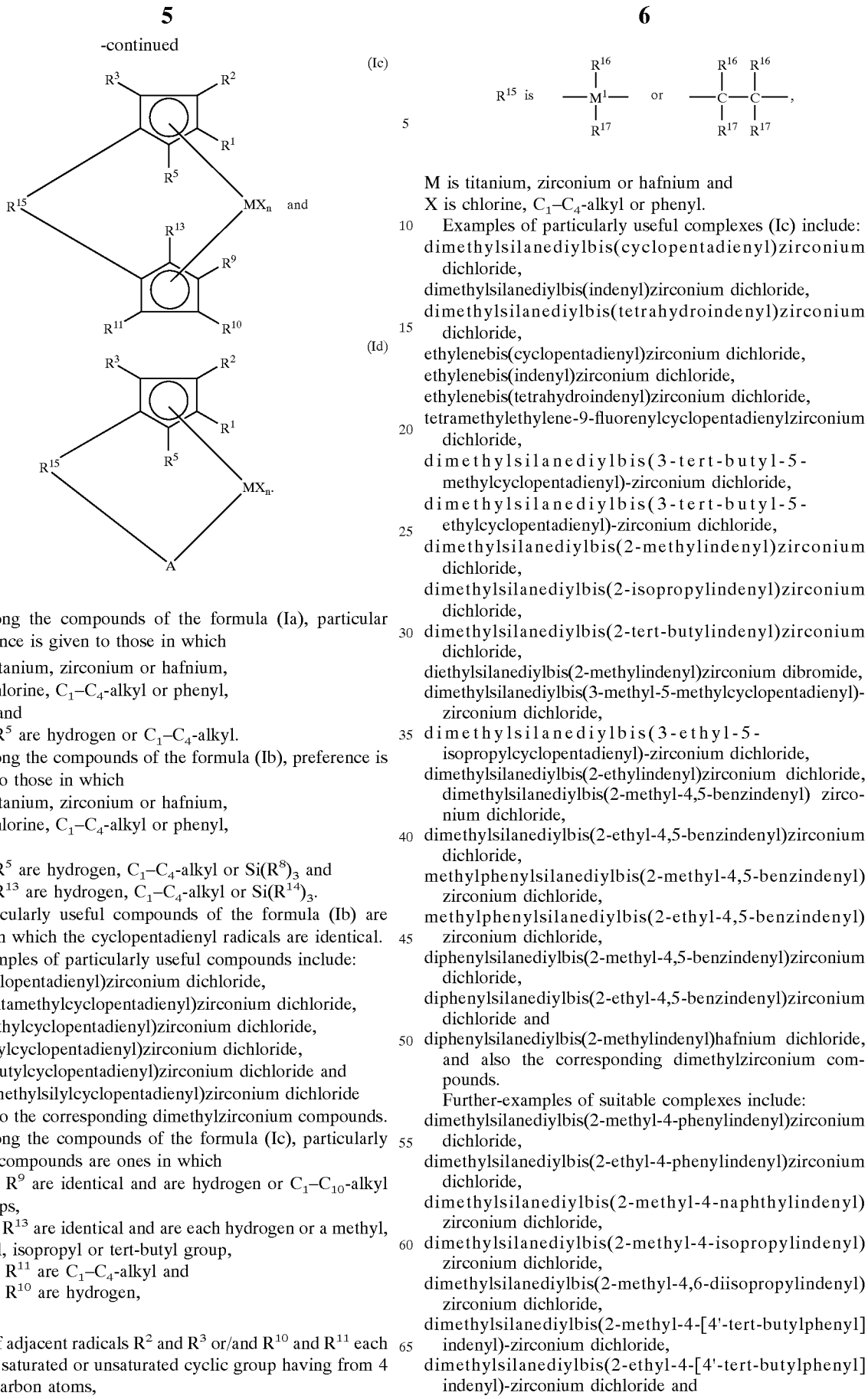

Among the compounds of the formula (Ia), particular preference is given to those in which
M is titanium, zirconium or hafnium,
X is chlorine, $C_1$–$C_4$-alkyl or phenyl,
n is 2 and
$R^1$ to $R^5$ are hydrogen or $C_1$–$C_4$-alkyl.

Among the compounds of the formula (Ib), preference is given to those in which
M is titanium, zirconium or hafnium,
X is chlorine, $C_1$–$C_4$-alkyl or phenyl,
n is 2,
$R^1$ to $R^5$ are hydrogen, $C_1$–$C_4$-alkyl or $Si(R^8)_3$ and
$R^9$ to $R^{13}$ are hydrogen, $C_1$–$C_4$-alkyl or $Si(R^{14})_3$.

Particularly useful compounds of the formula (Ib) are those in which the cyclopentadienyl radicals are identical.

Examples of particularly useful compounds include:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Among the compounds of the formula (Ic), particularly useful compounds are ones in which
$R^1$ and $R^9$ are identical and are hydrogen or $C_1$–$C_{10}$-alkyl groups,
$R^5$ and $R^{13}$ are identical and are each hydrogen or a methyl, ethyl, isopropyl or tert-butyl group,
$R^3$ and $R^{11}$ are $C_1$–$C_4$-alkyl and
$R^2$ and $R^{10}$ are hydrogen,
or
pairs of adjacent radicals $R^2$ and $R^3$ or/and $R^{10}$ and $R^{11}$ each form a saturated or unsaturated cyclic group having from 4 to 12 carbon atoms, M is titanium, zirconium or hafnium and
X is chlorine, $C_1$–$C_4$-alkyl or phenyl.

Examples of particularly useful complexes (Ic) include:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)-zirconium dichloride,
dimethylsilanediylbis(3-tert-butyl-5-ethylcyclopentadienyl)-zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)-zirconium dichloride,
dimethylsilanediylbis(3-ethyl-5-isopropylcyclopentadienyl)-zirconium dichloride,
dimethylsilanediylbis(2-ethylindenyl)zirconium dichloride,
dimethylsilanediylbis(2-methyl-4,5-benzindenyl) zirconium dichloride,
dimethylsilanediylbis(2-ethyl-4,5-benzindenyl)zirconium dichloride,
methylphenylsilanediylbis(2-methyl-4,5-benzindenyl) zirconium dichloride,
methylphenylsilanediylbis(2-ethyl-4,5-benzindenyl) zirconium dichloride,
diphenylsilanediylbis(2-methyl-4,5-benzindenyl)zirconium dichloride,
diphenylsilanediylbis(2-ethyl-4,5-benzindenyl)zirconium dichloride and
diphenylsilanediylbis(2-methylindenyl)hafnium dichloride, and also the corresponding dimethylzirconium compounds.

Further-examples of suitable complexes include:
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-naphthylindenyl) zirconium dichloride,
dimethylsilanediylbis(2-methyl-4-isopropylindenyl) zirconium dichloride,
dimethylsilanediylbis(2-methyl-4,6-diisopropylindenyl) zirconium dichloride,
dimethylsilanediylbis(2-methyl-4-[4'-tert-butylphenyl]indenyl)-zirconium dichloride,
dimethylsilanediylbis(2-ethyl-4-[4'-tert-butylphenyl]indenyl)-zirconium dichloride and dimethylsilanediylbis(2-propyl-4-[4'-tert-butylphenyl]
indenyl)-zirconium dichloride
and also the corresponding dimethylzirconium compounds.

In the case of the compounds of the formula (Id), particularly useful compounds are ones in which
M is titanium or zirconium,
X is chlorine, $C_1$–$C_4$-alkyl or phenyl,

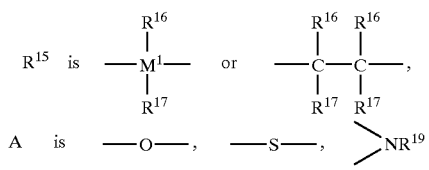

and
$R^1$ to $R^3$ and $R^5$ are hydrogen, $C_1$–$C_{10}$-alkyl, $C_3$–$C_{10}$-cycloalkyl, $C_6$–$C_{15}$-aryl or Si($R^8$)$_3$, or two adjacent radicals form a cyclic group having from 4 to 12 carbon atoms.

Such complexes can be synthesized by methods known per se, with preference being given to reaction of the appropriately substituted, cyclic hydrocarbon anions with halides of titanium, zirconium, hafnium, vanadium, niobium or tantalum.

Examples of suitable preparative methods are described, for example, in Journal of Organometallic Chemistry, 369 (1989), 359–370.

Mixtures of various metallocene complexes can also be used as component B).

Furthermore, the catalyst solid comprises at least one compound capable of forming metallocenium ions as component C).

Suitable compounds C) capable of forming metallocenium ions are, for example, strong, uncharged Lewis acids, ionic compounds having Lewis-acid cations or ionic compounds having Brönsted acids as cations.

As strong, uncharged Lewis acids, preference is given to compounds of the formula (II)

$$M^2X^1X^2X^3 \quad (II)$$

where
$M^2$ is an element of main group III of the Periodic Table, in particular B, Al or Ga, preferably B,
$X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula (II) in which $X^1$, $X^2$ and $X^3$ are identical, preferably tris(pentafluorophenyl)borane.

Suitable ionic compounds having Lewis-acid cations are compounds of the formula (III)

$$[(Y^{a+})Q_1Q_2 \ldots Q_z]^{d+} \quad (III)$$

where
Y is an element of main groups I to VI or transition groups I to VIII of the Periodic Table,
$Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and
z is an integer from 0 to 5,
d corresponds to the difference a–z, but d is greater than or equal to 1.

Particularly useful Lewis-acid cations are carbonium cations, oxonium cations and sulfonium cations and also cationic transition metal complexes. Particular mention may be made of the triphenylmethyl cation, the silver cation and the 1,1'-dimethylferrocenyl cation. They-preferably have noncoordinating counterions, in particular boron compounds as are also mentioned in WO 91/09882, preferably tetrakis(pentafluorophenyl)borate.

Ionic compounds having Brönsted acids as cations and preferably likewise noncoordinating counterions are mentioned in WO 91/09882; the preferred cation is N,N-dimethylanilinium.

The amount of strong, uncharged Lewis acids, ionic compounds having Lewis-acid cations or ionic compounds having Brönsted acids as cations is preferably from 0.1 to 10 equivalents, based on the metallocene complex B).

Suitable compounds C) capable of forming metallocenium ions also include the boron-aluminum compounds disclosed in WO 99/06414, for example di[bis(pentafluorophenyl)boroxy]methylalane.

Particularly useful compounds C) capable of forming metallocenium ions are open-chain or cyclic aluminoxane compounds of the formula (IV) or (V)

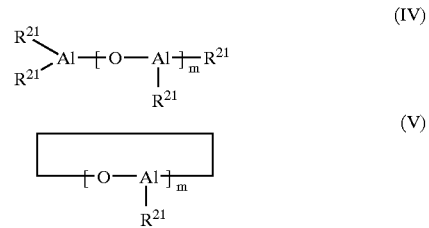

where $R^{21}$ is a $C_1$–$C_4$-alkyl group, preferably a methyl or ethyl group, and m is an integer from 5 to 30, preferably from 10 to 25.

The preparation of these oligomeric aluminoxane compounds is customarily carried out by reacting a solution of trialkylaluminum with water and is described, for example, in EP-A 284 708 and U.S. Pat. No. 4,794,096.

The oligomeric aluminoxane compounds obtained in this way are generally in the form of mixtures of both linear and cyclic chain molecules of various lengths, so that m is to be regarded as a mean. The aluminoxane compounds can also be present in admixture with other metal alkyls, preferably aluminum alkyls.

It has been found to be advantageous to use the metallocene complexes B) and the oligomeric aluminoxane compounds of the formula (IV) or (V) in such amounts that the atomic ratio of aluminum from the oligomeric aluminoxane compounds to the transition metal from the metallocene complexes is in the range from 10:1 to $10^6$:1, in particular in the range from 10:1 to $10^4$:1.

Furthermore, it is also possible to use aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof in place of the aluminoxane compounds of the formulae (IV) and (V) as component C).

Both the metallocene complexes B) and the compounds C) capable of forming metallocenium ions are preferably used in solution, particularly preferably in aromatic hydrocarbons having from 6 to 20 carbon atoms, in particular xylenes and toluene.

The catalyst solid can further comprise, as additional component D), a metal compound of the formula (VI)

where
M$^3$ is an alkali metal, an alkaline earth metal or a metal of main group III of the Periodic Table, i.e. boron, aluminum, gallium, indium or thallium,
R$^{22}$ is hydrogen, C$_1$–C$_{10}$-alkyl, C$_6$–C$_{15}$-aryl, alkylaryl or arylalkyl each having from 1 to 10 carbon atoms in the alkyl radical and from 6 to 20 carbon atoms in the aryl radical,
R$^{23}$ and R$^{24}$ are hydrogen, halogen, C$_1$–C$_{10}$-alkyl, C$_6$–C$_{15}$-aryl, alkylaryl, arylalkyl or alkoxy each having from 1 to 10 carbon atoms in the alkyl radical and from 6 to 20 carbon atoms in the aryl radical,
r is an integer from 1 to 3
and
s and t are integers from 0 to 2, where the sum r+s+t corresponds to the valence of M$^3$,
where the component D) is not identical to the component C).

Among the metal compounds of the formula (VI), preference is given to those in which
M$^3$ is lithium, magnesium or aluminum and
R$^{23}$ and R$^{24}$ are C$_1$–C$_{10}$-alkyl.

Particularly preferred metal compounds of the formula (VI) are n-butyllithium, n-butyl-n-octylmagnesium, n-butyl-n-heptylmagnesium, tri-n-hexylaluminum, triisobutylaluminum, triethylaluminum and trimethylaluminum.

If a metal compound D) is used, it is preferably present in the catalyst solid in such an amount that the molar ratio of M$^3$ from formula (VI) to transition metal M from formula (I) is from 800:1 to 1:1, in particular from 500:1 to 50:1.

In the process of the present invention for preparing the catalyst solid, finely divided support particles are firstly prepared from an adduct of the magnesium halide A) and a C$_1$–C$_8$-alkanol in a first process step i). This gives an optimal distribution of magnesium halide and C$_1$–C$_8$-alkanol.

Particularly suitable C$_1$–C$_8$-alkanols are, for example, methanol, ethanol, n-propanol or n-butanol. Preference is given to using ethanol.

The preparation of these finely divided support particles is known per se and can be carried out, for example, by suspending and heating anhydrous magnesium halide together with the C$_1$–C$_8$-alkanol in an inert liquid in which they are not soluble. Suitable suspension media are paraffin oils, silicone oils or mixtures thereof. The suspension is usually heated to from 50 to 140° C., preferably from 100 to 120° C. The molten adducts generally formed are dispersed in the liquid by means of vigorous stirring and are then rapidly cooled, preferably by introduction into a liquid at a low temperature. Such processes are described, for example, in U.S. Pat. No. 4,469,648.

The mean particle diameter of the finely divided support particles used in the process of the present invention is from 1 to 200 µm, preferably from 15 to 90 µm and in particular from 20 to 75 µm. In addition, the support particles preferably have a specific surface area in the range from 100 to 350 m$^2$/g, preferably in the range from 150 to 250 m$^2$/g, and a pore volume in the range from 0.1 ml/g to 0.7 ml/g, preferably in the range from 0.15 ml/g to 0.4 ml/g. The specific surface area and the pore volume can be determined by the nitrogen adsorption method in accordance with DIN 66131 or by mercury porosimetry in accordance with DIN 66133.

The C$_1$–C$_8$-alkanol content of the finely divided support particles is set to a value in the range from 1.5 to 5 mol, preferably from 1.8 to 3.5 mol and in particular from 1.9 to 2.5 mol of C$_1$–C$_8$-alkanol per mol of magnesium halide. Her, it is possible, for example, to reduce the alcohol content to th desired content by application of reduced pressure and/or heating of the support particles.

Subsequently, in step ii), the compound C) capable of forming metallocenium ions or, if a metal compound D) is additionally used, this or a mixture of compound C) capable of forming metallocenium ions and metal compound D) is deposited on the finely divided support particles. Here, the amount of compound C) and/or D) deposited is at least 1 mol per mol of C$_1$–C$_8$-alkanol.

The reaction product obtained is then, in process step iii), brought into contact with the metallocene complex B), with a metal compound D) being able to be additionally added at the same time. If a metal compound D) has already been added in step ii), the metal compound D) used in step iii) can be the same compound or a different metal compound D). If only a metal compound D) and no compound C) capable of forming metallocenium ions has been used in process step ii), both the metallocene complex B) and the compound C) capable of forming metallocenium ions are brought into contact with the reaction product from step ii) in step iii). The components B) and C) can be added separately, but it is also possible to bring B) and C) into contact with one another first and only then to add the mixture to the reaction product from step ii).

Step iii) can be carried out by mixing all components with one another in solution or in suspension and subsequently taking off the solvent. However, the finely divided support material can also be brought into contact with the metallocene complex B) by an impregnation method, as described, for example, in the German Patent Application No. 19833170.3.

In a particularly preferred embodiment of the process of the present invention, aluminoxane compounds of the formulae (IV) and (V) as compound C) capable of forming metallocenium ions, if desired together with a metal compound D), are added in step ii) and the reaction product of metallocene complex B) and a further amount of the aluminoxane compounds of the formulae (IV) and (V) is added in step iii).

The catalyst solid obtainable by the process of the present invention is suitable, in general together with a further metal compound D) which may be different from the metal compound or compounds D) used in the preparation of the catalyst solid, for use as catalyst for the polymerization or copolymerization of olefins.

It is also possible firstly to prepolymerize the catalyst solid and then to use the resulting prepolymerized catalyst solid in the actual polymerization.

This polymerization can be carried out in a known manner in bulk, in suspension or in the gas phase in the customary reactors used for the polymerization of olefins. It can be carried out batchwise or preferably continuously in one or more stages. Solution processes, suspension processes, stirred gas-phase processes or gas-phase fluidized-bed processes are all possible. As solvent or suspension medium, it is possible to use inert hydrocarbons such as isobutene, or else the monomers themselves.

The polymerizations are generally carried out at from 20 to 150° C. and pressures in the range from 1 to 100 bar at mean residence times of from 0.5 to 5 hours. Preference is given to temperatures of from 60 to 90° C., pressures of from 20 to 35 bar and mean residence times of from 0.5 to 3 hours. Molar mass regulators, for example hydrogen, or customary additives such as antistatics can also be used in the polymerization.

The catalyst solids of the present invention can be prepared by a relatively uncomplicated process, give polymers having a good morphology in the polymerization of olefins and give polymers which have a very low content of particulate catalyst residues. The polymers which can be obtained are thus suitable for producing moldings and, in particular, films and fibers.

EXAMPLES

All preparative work was carried out using standard Schlenk techniques under a protective nitrogen or argon atmosphere in glass vessels which had been made inert.

The samples were characterized by means of the following tests:

Determination of the mean particle diameter:
To determine the mean particle diameter, the particle size distribution was determined by Coulter Counter analysis in accordance with ASTM standard D 4438 and the volume-based mean (median) was calculated therefrom.

Determination of the pore volume:
By mercury porosimetry in accordance with DIN 66133.

Determination of the specific surface area:
By nitrogen adsorption in accordance with DIN 66131

Determination of the melting point:
The melting point was determined by DSC in accordance with ISO standard 3146 using a first heating step at a heating rate of 20° C. per minute to 200° C., a dynamic crystallization at a cooling rate of 20° C. per minute to 25° C. and a second heating step at a heating rate of 20° C. per minute once again to 200° C. The melting point is then the temperature at which the enthalpy versus temperature curve measured in the second heating step displays its maximum.

Determination of the breadth of the molar mass distribution (Q value):
Gel permeation chromatography (GPC) was carried out at 145° C. in 1,2,4-trichlorobenzene using a GPC instrument 150 C. from Waters. The data were evaluated using the Win-GPC software from HS-Entwicklungsgesellschaft für wissenschaftliche Hard-und Software mbH, Ober-Hilbersheim. The columns were calibrated by means of polypropylene standards having molar masses from 100 to $10^7$ g/mol.

The mass (weight) average ($M_w$) and number average ($M_n$) of the molar masses of the polymers were determined. The Q value is the ratio of mass average ($M_w$) to number average ($M_n$).

Determination of the pressure rise during melt filtration:
The pressure rise during melt filtration was determined by extrusion of the polypropylene through a metal filter disk with a support mesh having a mesh opening of 5 μm at 265° C. and a throughput rate of 2 kg/h in a standard laboratory extruder (3-zone screw). The pressure rise was recorded against time for 1 hour at a constant polypropylene throughput rate.

Example 1 a) Preparation of the $MgCl_2$ Support

In a round-bottomed flask, 48 g of anhydrous magnesium chloride (Aldrich) together with 77 g of anhydrous ethanol were suspended in a mixture of 50 ml of silicone oil (grade AK 350 from Wacker) and 50 ml of paraffin oil (DAB-10-530), with an exothermic reaction occurring. The mixture was heated while stirring to 120° C. and transferred as a homogeneous melt into a second reaction vessel containing 400 ml of the above-described 1:1 mixture of paraffin and silicone oil which had likewise been heated to 120° C. While stirring vigorously by means of an Ultraturrax stirrer, the $MgCl_2$.3 EtOH melt was suspended for about 5 minutes in the oil mixture and subsequently introduced rapidly into about 2 l of cold (−78° C.) heptane. The temperature was kept below 0° C. during the addition. The quenched $MgCl_2$.3 EtOH suspension was precipitated as a white solid which was filtered off by means of a glass frit. The solid was washed once with 50 ml of heptane and twice with 50 ml each time of pentane and then dried in a stream of nitrogen. This gave 158 g of a white, extremely hygroscopic solid. Under the microscope, only spherical particles could be seen. Elemental analysis indicated a complex of the stoichiometry $MgCl_2$.2.5 EtOH.

The mean particle diameter was 50 μm, the specific surface area was 250 $m^2$/g and the pore volume was 0.4 ml/g.

b) Preparation of the Catalyst Solid 10 g of the spherical $MgCl_2$.2.5 EtOH obtained in Example 1a) were suspended in 30 ml of toluene, and 80 ml of 1.53 molar MAO solution in toluene (Witco) were added dropwise, with the temperature not exceeding 35° C. Only little evolution of gas was found. The mixture was then stirred at room temperature for 6 hours, filtered, washed twice with toluene and dried in a stream of $N_2$ until the product was free-flowing.

Yield: 11 g.

5.5 g of this solid were placed in a column which was fitted with a glass frit and was closed at the lower end by means of a stopcock and carefully covered with a solution of 249 mg of rac-dimethylsilanediylbis(2-methyl-4,5-benzindenyl)zirconium dichloride in 40.9 ml of 1.53 molar MAO solution. The stopcock was opened and the liquid was allowed to run out slowly. As soon as the first colored drops ran out, the stopcock was closed. The contents of the column above the glass frit were mixed and allowed to stand for 12 hours. The material was subsequently filtered, washed twice with pentane and dried in a stream of $N_2$.

Yield: 6.6 g of a deep orange powder c) Polymerization

A 10 liter autoclave was flushed with nitrogen. In a countercurrent of nitrogen, firstly 10 ml of a 2 molar solution of triisobutylaluminum and subsequently 300 mg of the catalyst solid prepared in Example 1b) were then introduced into the autoclave. Subsequently, 7 l of liquid propylene were introduced into the autoclave. The autoclave was heated until the internal temperature was 65° C. and polymerization was carried out for 90 minutes. After venting the autoclave, 110 g of polypropylene were obtained. The morphology was excellent.

The melting point was 143.9° C. and the Q value (the ratio $M_w/M_n$) was 2.0. In the melt filtration, a pressure rise of 1 bar/kg of polypropylene was observed.

Example 2 a) Preparation of the MgCl$_2$ Support 20 g of the finely divided support particles obtained in Example 1a) were dried at room temperature for 2 hours at 1 mbar. This reduced the ethanol content. A spherical support having a stoichiometry of MgCl$_2$.1.9 EtOH was obtained.

The mean particle diameter was 50 µm, the specific surface area was 270 m$^2$/g and the pore volume was 0.5 ml/g.

b) Preparation of the Catalyst Solid

The experiment described in Example 1b) was repeated under identical conditions using 10 g of the support particles obtained in Example 2a). This gave 6.8 g of a deep orange powder.

c) Polymerization

The polymerization described in Example 1c) was repeated under identical conditions, but 500 mg of the catalyst solid prepared in Example 2b) were added. After venting the autoclave, 480 g of polypropylene were obtained. The morphology was very good: the powder had a granular morphology. No lumps or d posits were found.

The melting point was 144.0° C. and the Q value (the ratio $M_w/M_n$) was 2.1. In the melt filtration, a pressure rise of 1 bar/kg of polypropylene was observed.

Comparative Example A a) Preparation of the MgCl$_2$ Support 20 g of the finely divided support particles obtained in Example 1a) were dried for 24 hours at 40° C. and 0.1 mbar. This reduced the ethanol content. A spherical support having the stoichiometry MgCl$_2$.0.9 EtOH was obtained.

The mean particle diameter was 50 µm, the specific surface area was 290 m$^2$/g and the pore volume was 0.6 ml/g.

b) Preparation of the Catalyst Solid

The experiment described in Example 1b) was repeated under identical conditions using 10 g of the support particles obtained in Example Aa). This gave 4.5 g of a deep orange powder.

c) Polymerization

The polymerization described in Example 1c) was repeated under identical conditions, but 350 mg of the catalyst solid prepared in Example Ab) were added.

After venting the autoclave, 150 g of polypropylene were obtained. The polymer powder contained about 10% by weight of lumps having a diameter of more than 5 cm.

The melting point was 144.5° C. and the Q value (the ratio $M_w/M_n$) was 2.6. In the melt filtration, a pressure rise of 5 bar/kg of polypropylene was observed.

Comparative Example B a) Preparation of the MgCl$_2$ Support

The MgCl$_2$ support was prepared by the method reported in Example 1a) of EP-A 435 514. A fine powder was obtained.

b) Preparation of the Catalyst Solid

The experiment described in Example 1b) was repeated under identical conditions using 10 g of the support particles obtained in Example Ba). 7 g of a deep orange powder were obtained.

c) Polymerization

The polymerization described in Example 1c) was repeated under identical conditions, but 300 mg of the catalyst solid prepared in Example Bb) were added.

After venting the autoclave, 150 g of polypropylene (powder) containing about 15% by weight of lumps were obtained. The stirrer was coated with about 10 g of a deposit having a melting point of 149° C.

Comparative Example C a) Support Material

Silica gel S 2101 from Grace GmbH, Worms, was used as support material.

b) Preparation of the Catalyst Solid

The experiment described in Example 1b) was repeated under identical conditions using 10 g of the silica gel defined in Ca). This gave 18 g of a deep orange powder.

c) Polymerization

The polymerization described in Example 1c) was repeated under identical conditions, but 250 mg of the catalyst solid prepared in Example Cb) were added.

After venting the autoclave, 1500 g of a polymer powder containing no lumps were obtained.

The melting point was 144.5° C. and the Q value (the ratio $M_w/M_n$) was 2.0. In the melt filtration, a pressure rise of 15 bar/kg of polypropylene was observed.

We claim:

1. A process for preparing a catalyst solid for olefin polymerization comprising
   A) at least one magnesium halide,
   B) at least one metallocene complex and
   C) at least one compound capable of forming metallocenium ions,
   which comprises
   i) firstly preparing finely divided support particles consisting of the magnesium halide A) and C$_1$–C$_8$-alcohol having a mean particle diameter of from 1 to 200 µm from an adduct of the magnesium halide A) and a C$_1$–C$_8$-alcohol, where the adduct contains from 1.5 to 5 mol of the C$_1$–C$_8$-alcohol per mole of magnesium halide,
   ii) then depositing the compound C) capable of forming metallocenium ions on the finely divided support particles and
   iii) subsequently bringing the reaction product hereby obtained into contact with the metallocene complex B).

2. The process as claimed in claim 1, wherein said magnesium halide A) is magnesium chloride.

3. The process as claimed in claim 1, wherein said at least one metallocene complex is a compound of the formula (I),

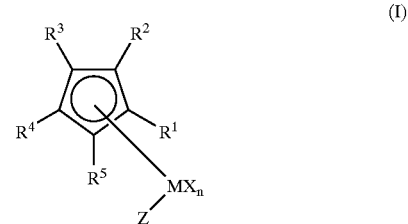

(I)

wherein

M is titanium, zirconium, hafnium, vanadium, niobium or tantalum, or an element of transition group III of the Periodic Table or the lanthanides, X is fluorine, chlorine, bromine, iodine, hydrogen, C$_1$–C$_{10}$-alkyl, C$_6$–C$_{15}$-aryl, alkylaryl having from 1 to 10 carbon atoms in the alkyl radical and from 6 to 20 carbon atoms in the aryl radical, —OR$^6$ or —NR$^6$R$^7$, n is 1, 2 or 3 and corresponds to the valence of M minus 2, where $R^6$ and $R^7$ are identical or different and are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different, $R^1$ to $R^5$ are identical or different and are hydrogen, $C_1$–$C_{10}$-alkyl, 5- to 7-membered cycloalkyl which optionally contains $C_1$–$C_{10}$-alkyl groups as substituents, $C_6$–$C_{15}$-aryl or arylalkyl, where two adjacent radicals optionally together form a saturated or unsaturated cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, and Z is identical or different from X and has the same definition as X or is

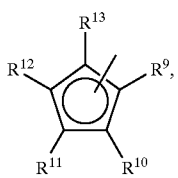

where the radicals $R^9$ to $R^{13}$ are identical or different and are hydrogen, $C_1$–$C_{10}$-alkyl, 5- to 7-membered cycloalkyl which optionally contains $C_1$–$C_{10}$-alkyl groups as substituents, $C_6$–$C_{15}$-aryl or arylalkyl, where two adjacent radicals optionally together form a saturated or unsaturated cyclic group having from 4 to 15 carbon atoms, or $Si(R^{14})_3$ where $R^{14}$ is $C_1$–$C_{10}$-alkyl, $C_3$–$C_{10}$-cycloalkyl or $C_6$–$C_{15}$-aryl, or the radicals $R^4$ and Z together form a —$R^{15}$—A— group, where

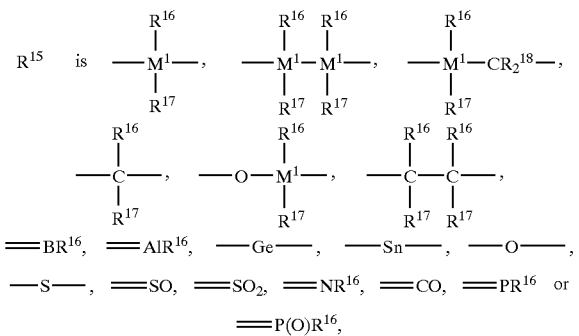

where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is 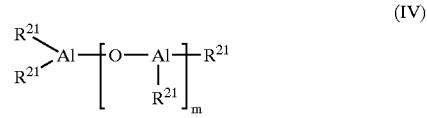

where $R^{19}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{20})_3$, $R^{20}$ is hydrogen, $C_1$–$C_{10}$-alkyl, $C_6$–$C_{15}$-aryl which optionally contains $C_1$–$C_4$-alkyl groups as substituents or $C_3$–$C_{10}$-cycloalkyl or the radicals $R^4$ and $R^{12}$ together form a —$R^{15}$— group.

4. A process as claimed in claim 1, wherein said compound C) is an open-chain or cyclic aluminoxane compounds of the formula (IV) or (V),

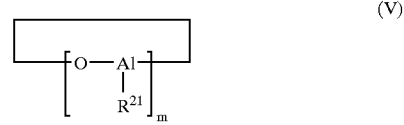

wherein $R^{21}$ is a $C_1$–$C_4$-alkyl group and m is an integer from 5 to 30.

5. A process as claimed in claim 1, wherein the catalyst solid further comprises one or more metal compounds of the formula (VI), $$M^3(R^{22})_r(R^{23})_s(R^{24})_t \qquad (VI)$$

wherein $M^3$ is an alkali metal, an alkaline earth metal or a metal of main group III of the Periodic Table, $R^{22}$ hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^{23}$ and $R^{24}$ are identical or different and are hydrogen, halogen, $C_1$–$C_{10}$-alkyl, $C_1$–$C_{10}$-alkoxy, $C_6$–$C_{15}$-aryl, alkylaryl or arylalkyl each having from 1 to 10 carbon atoms in the alkyl radical and from 6 to 20 carbon atoms in the aryl radical, r is an integer from 1 to 3 and s and t are identical or different integers from 0 to 2, where the sum r+s+t corresponds to the valence of $M^3$, as additional component D), where the metal compounds D) are added in process step ii) together with the compound C) capable of forming metallocenium ions and/or in process step iii) together with the metallocene complex B), or the metal compounds D) are used in place of the compound C) capable of forming metallocenium ions in process step ii) and the metallocene complex B) and the compound C) capable of forming metallocenium ions are then added together in process step iii).

6. The process as claimed in claim 1, wherein said $C_1$–$C_8$-alcohol is ethanol.

7. A solid catalyst for olefin polymerization obtained by the process as claimed in claim 1.

8. A process for preparing polyolefins which comprises polymerizing or copolymerizing olefins in the presence of the catalyst solid as claimed in claim 7.

* * * * *